310-10 SR SEARCH ROOM
FIP8502 OR 3,402,307

MOTORS AND GENERATORS EMPLOYING SUPERCONDUCTORS

Filed March 23, 1965 5 Sheets-Sheet 1

INVENTOR.
JUDEA PEARL
BY Samuel Cohen
Attorney

MOTORS AND GENERATORS EMPLOYING SUPERCONDUCTORS

Filed March 23, 1965 5 Sheets-Sheet 2

INVENTOR.
JUDEA PEARL
BY Samuel Cohen
Attorney

INVENTOR.
JUDEA PEARL
BY [signature]
Attorney

MOTORS AND GENERATORS EMPLOYING SUPERCONDUCTORS

Filed March 23, 1965 5 Sheets-Sheet 4

INVENTOR.
JUDEA PEARL
BY
Attorney

MOTORS AND GENERATORS EMPLOYING SUPERCONDUCTORS

Filed March 23, 1965 5 Sheets-Sheet 5

INVENTOR.
JUDEA PEARL
BY
[signature]
ATTORNEY

United States Patent Office 3,402,307

Patented Sept. 17, 1968

3,402,307
MOTORS AND GENERATORS EMPLOYING SUPERCONDUCTORS

Judea Pearl, Kendall Park, N.J., assignor to Radio Corporation of America, a corporation of Delaware Filed Mar. 23, 1965, Ser. No. 442,031
31 Claims. (Cl. 310—10)

ABSTRACT OF THE DISCLOSURE

Motors and generators which depend for their operation on the movement of nonsuperconducting areas through a superconductor material. In the operation as a motor, a current applied to a superconductor containing such an area causes movement of this area at an angle to the direction of current flow, and a rotor magnetically coupled to the area moves along with it. The magnetic coupling may be achieved by magnets which are fixed to the rotor or by external magnetic field producing means. In the latter cases, the rotor is made of a magnetic field shield means but is formed with magnetic field permeable regions. In the operation of the invention as a generator, the rotor is mechanically driven and the nonsuperconducting areas magnetically coupled to the rotor move through the superconductor following the movement of the rotor. A current is thereby generated which flows through the superconductor at an angle to the direction of movement of the nonsuperconducting areas.

An object of the invention is to provide motors and generators which operate at extremely low temperatures and which exploit the properties of metals which are superconductors, particularly type II superconductors, at these low temperatures.

Another object of the invention is to provide motors and generators which require neither brushes, nor moving contacts, nor commutators.

Another object of the invention is to provide motors and generators which are simple, efficient, and relatively inexpensive.

The motors and generators of the invention operate on the principle of current-induced movement of superconductor-normal boundaries in a superconducting material. In the case of a simple motor, for example, a normal (resistive) area is initially established in a superconducting material and magnet means is coupled to this area. A current applied to the superconductor material causes the normal area to move and, due to the strong coupling between this area and the magnet, the magnet to move with it. The magnet is preferably rotatably mounted and the superconducting material may be in the form of a cylinder surrounding the magnet. Many other more complex embodiments of motors in accordance with the invention are discussed in greater detail below. All of these embodiments can be made to operate as generators by mechanically driving the magnet means and connecting an electrical load to the superconducting material to receive the current produced in the superconducting material.

The invention is discussed in greater detail below and is described in the following drawings, of which:

Figures 1, 2, 3, 4, 5A, 5B, 5C:
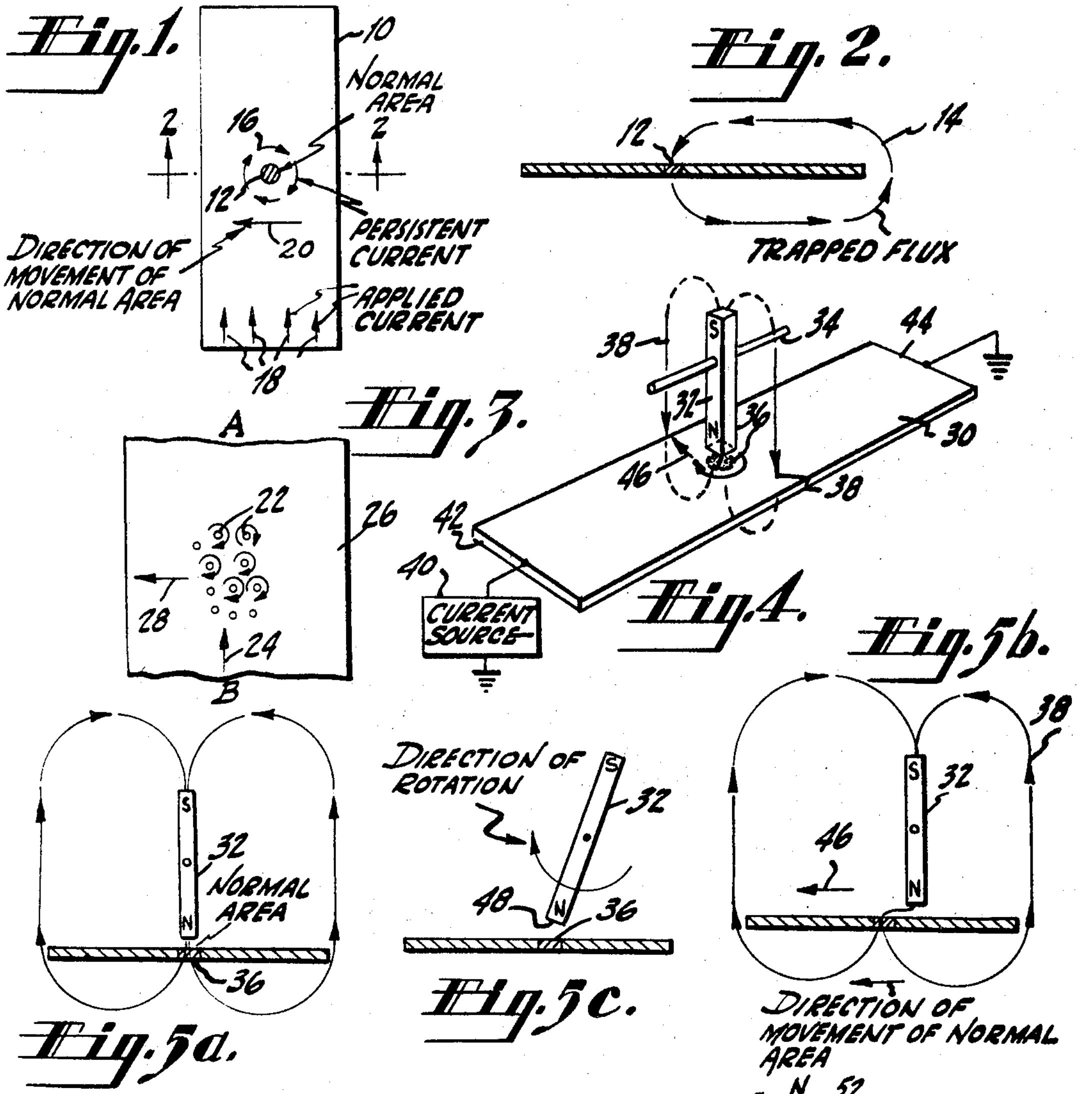
FIGURE 1 is a plan view of a type I superconductor in which a normal area has been induced.
FIGURE 2 is a cross-section along line 2—2 of FIGURE 1.
FIGURE 3 is a schematic representation of a type II superconductor in which a plurality of small normal areas, known in the art as "superconducting vortices," have been induced.
FIGURE 4 is a schematic diagram of a simple motor according to the invention.
Figures 7A, 7B, 8, 9A, 9B:
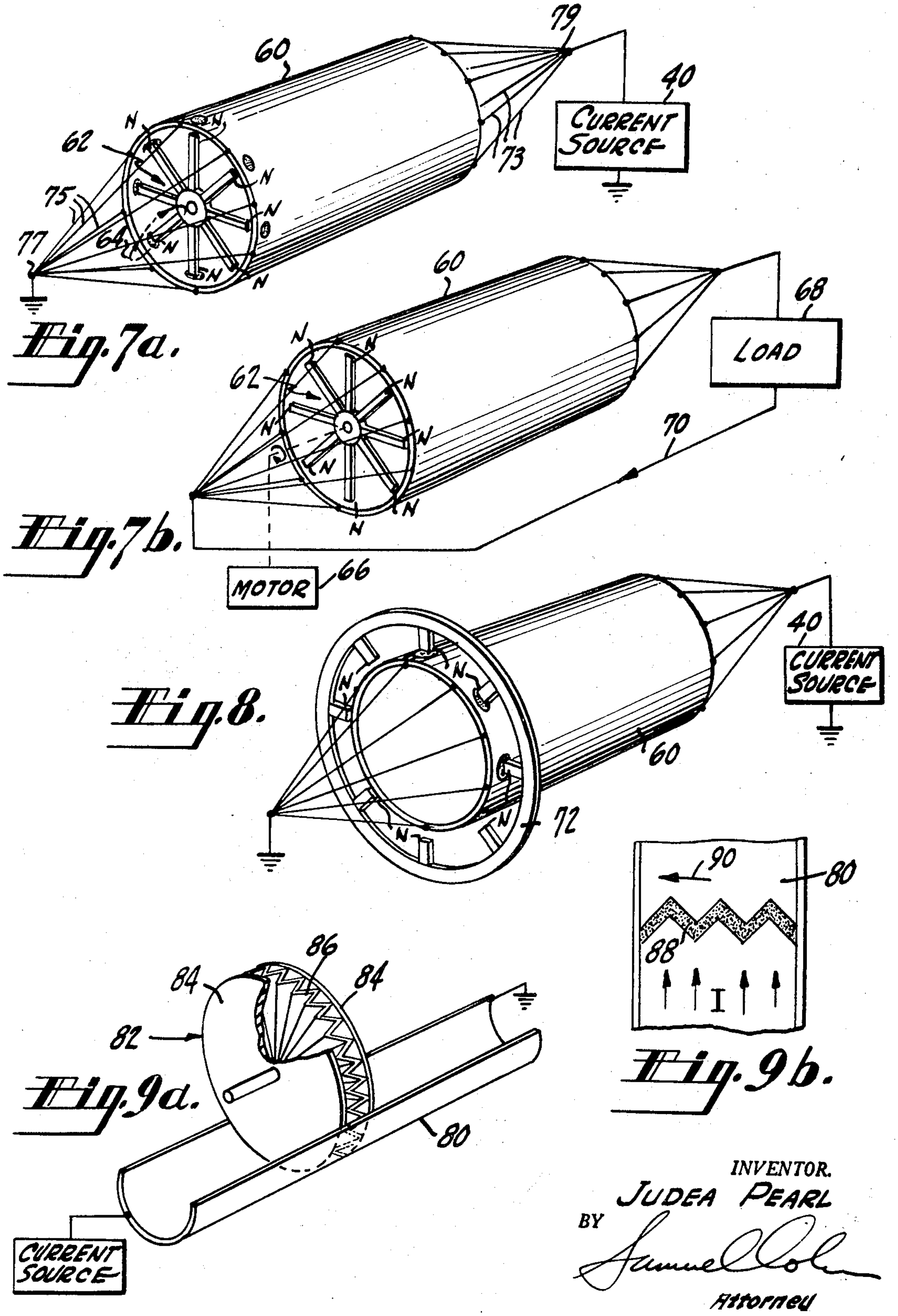
Figures 12, 13A:
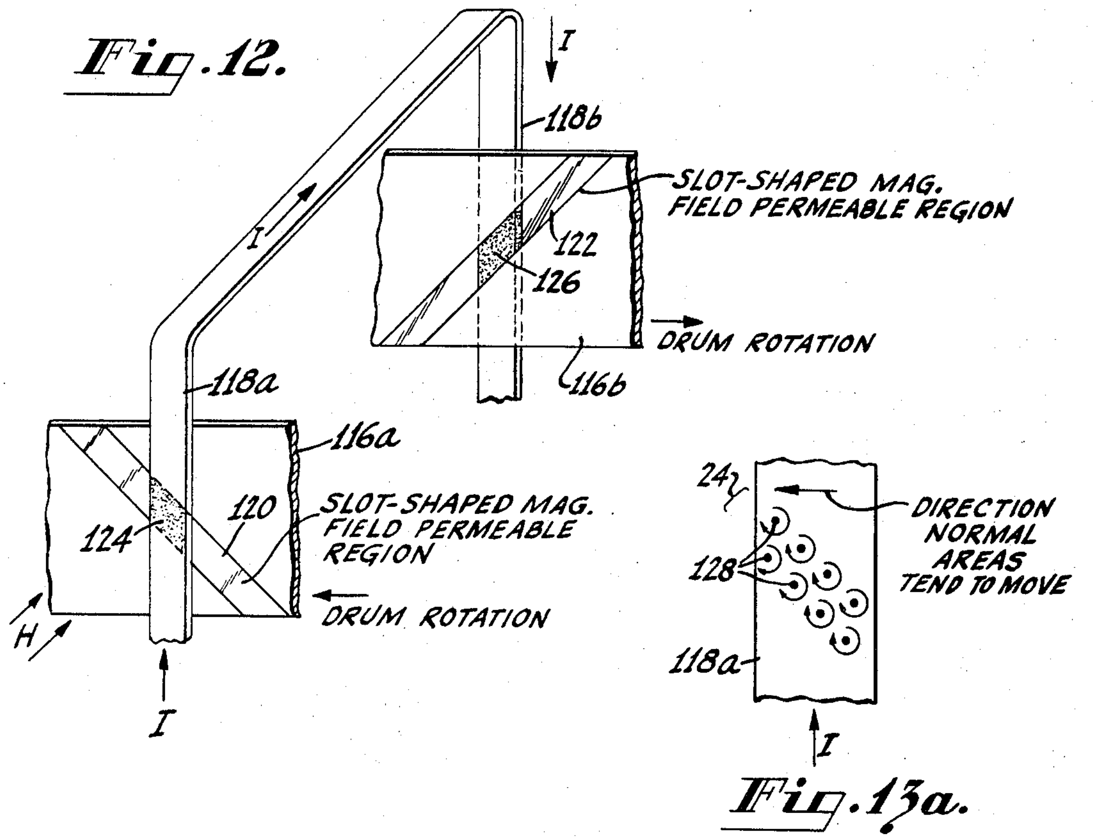
Figures 13B, 14:
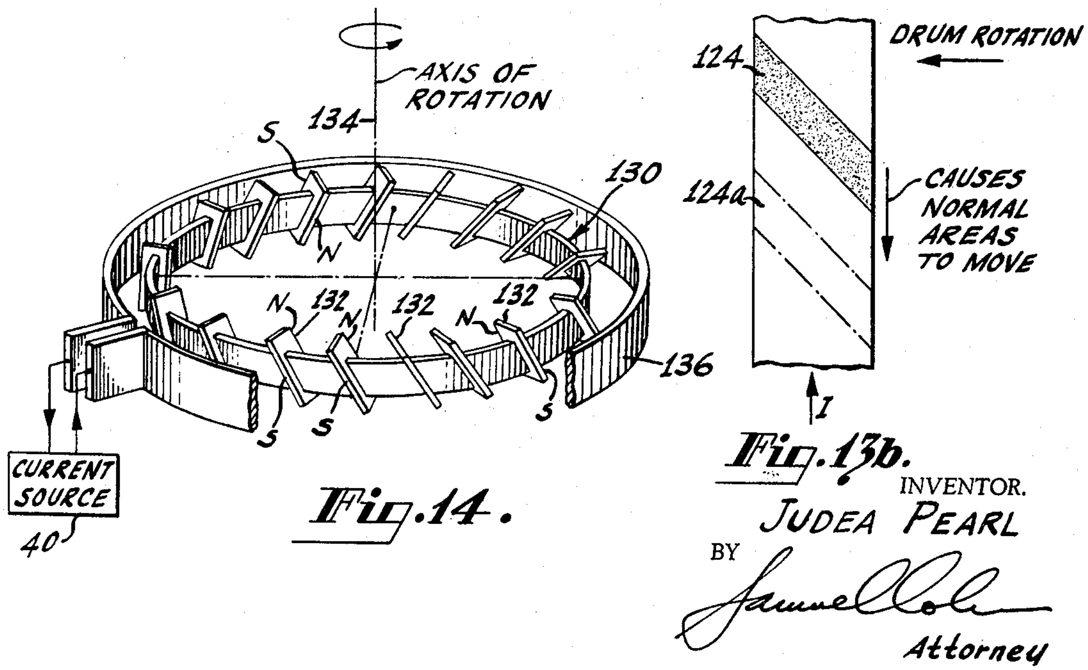
Figure 15:
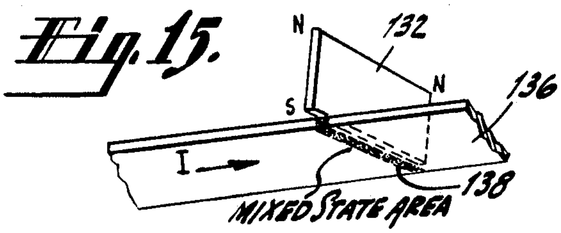
Figure 16:
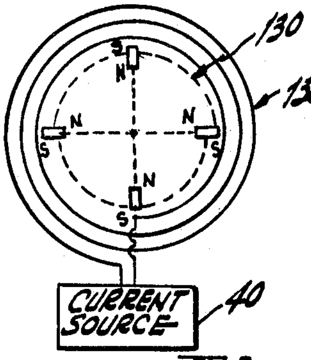
Figure 17:
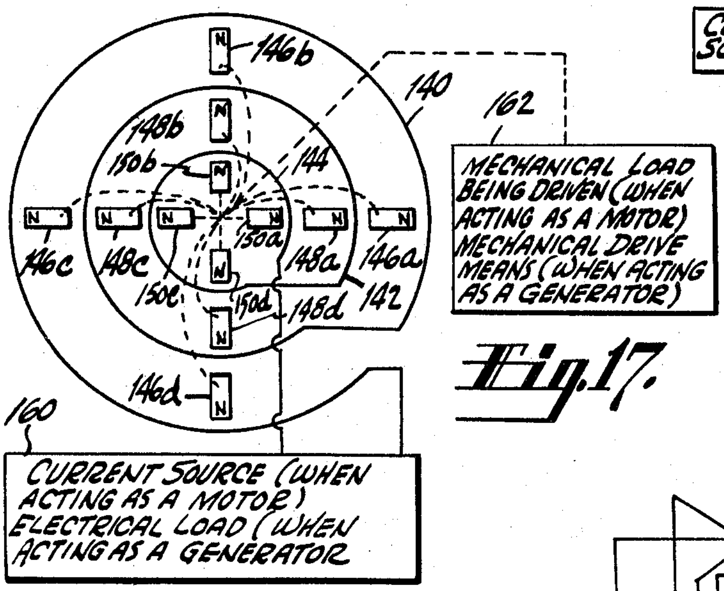
Figures 18, 19:
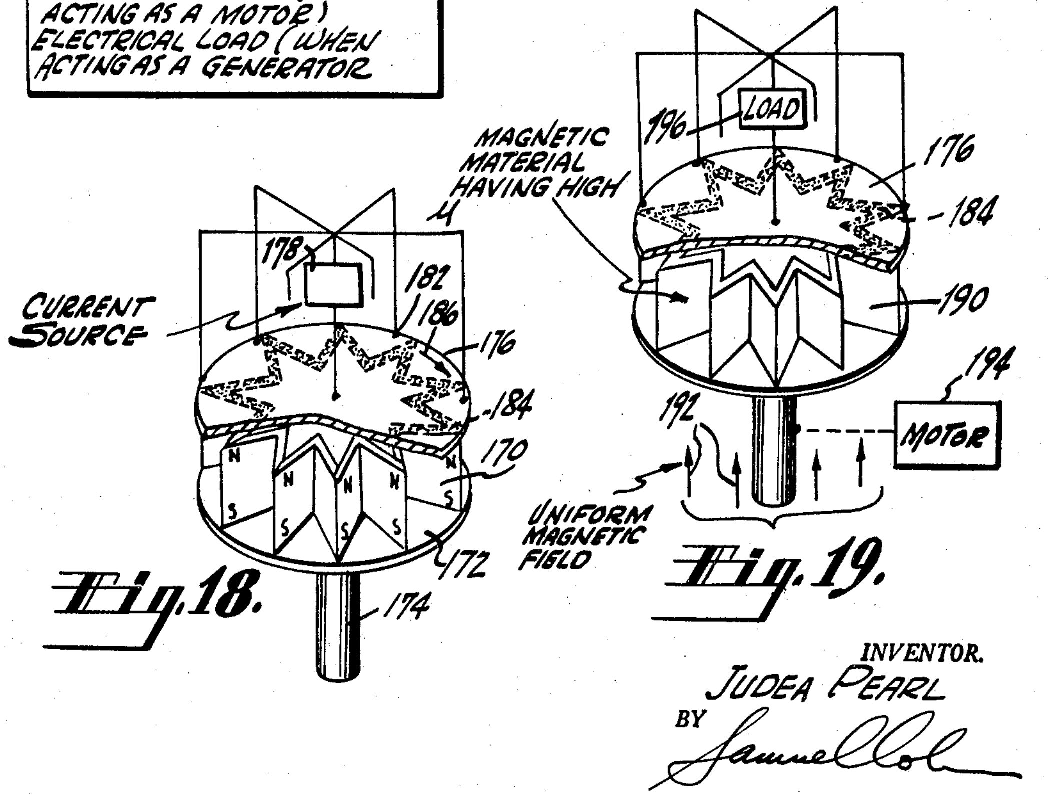

FIGURES *5a–5c* are sketches to help explain the operation of the motor of FIGURE 4;

FIGURE *6a* is a schematic, perspective drawing of a more complex motor according to the invention;

FIGURE *6b* is a showing of a portion of the arrangement of FIGURE *6a*, in modified form;

FIGURE *7a* is a schematic, perspective showing of another form of motor according to the invention;

FIGURE *7b* is a showing of a generator analogous to the motor of FIGURE *7a*;

FIGURE 8 is a schematic, perspective drawing of another form of motor according to the invention;

FIGURE *9a* is a perspective showing of another form of generator according to the invention;

FIGURE *9b* is a plan view of a portion of the arrangement of FIGURE *9a*;

FIGURE *10a* is a plain view of another form of motor according to the invention;

FIGURE *10b* is a side view of the arrangement of FIGURE *10a*;

FIGURE *10c* is a plan view of a portion of the arrangement of FIGURE *10a*;

FIGURE *11a* is a perspective view of yet another form of motor according to the invention;

FIGURE *11b* is a perspective view of another form of motor according to the invention, which is similar in some respects to the motor of FIGURE *11a*;

FIGURES 12, *13a* and *13b* are drawings to help explain the operation of the motor of FIGURE 11;

FIGURE 14 is a perspective, partially cut-away view of another form of the invention;

FIGURE 15 is a perspective view to help illustrate the operation of the arrangement of FIGURE 14;

FIGURE 16 is a schematic showing of a modified form of the motor of FIGURE 14;

FIGURE 17 is a schematic showing of a motor and a generator which are also modified forms of the arrangement of FIGURE 14;

FIGURE 18 is a perspective view of another form of motor according to the invention; and FIGURE 19 is a perspective view of another form of generator according to the invention.

In the discussion which follows, a low temperature environment at which superconductivity is possible, such as one at a few degrees Kelvin, is assumed. The means providing such an environment is well known and is not discussed herein.

Referring first to FIGURE 1, element 10 is a type I superconductor such as tin or the like. A normal area 12 may be established in the superconductor as, for example, by applying a concentrated magnetic field to the material. A simple way this can be done is to move a permanent magnet or a current-carrying coil close to the surface of the superconductor. The magnetic field drives the superconducting material to its normal condition and the magnetic flux penetrates through this normal area. When the magnetic field is removed, the flux, schematically shown at 14 in FIGURE 2, remains trapped and a persistent circulating current, shown schematically by arrow 16, in FIGURE 1, flows in the superconductor material.

For the purposes of the present discussion, it may be assumed that the normal area remains where indicated when the inducing magnetic field is removed. If now a current, indicated by arrows 18, is passed along the length of the superconductor material 10, it will tend to add to the circulating current at the left side of the normal area and subtract from the circulating current on the right side of the normal area. The right portion of the normal area therefore tends to change from the normal to the superconducting state and, similarly, the superconductive region immediately to the left of the normal area tends to change from the superconducting to the normal state. The net effect then of the applied current 18 is to cause the normal area 12 to move to the left, as indicated by the arrow 20.

In a type II superconductor (such as niobium stannate ($Nb_3Sn$), or an alloy of tin plus 3% by weight of indium, or an alloy consisting of lead plus 3% by weight of tantalum) a uniform magnetic field can penetrate through an array of relatively small normal areas in the superconductor. Each such normal area, known as a vortex, carries one quantum of flux ($2\times10^{-7}$ gauss). The radius of each vortex core is 100–500 angstroms, and the distance between adjacent vortices decreases from 1000–5000 angstroms at low magnetic fields until the cores overlap at the critical magnetic field. (The critical magnetic field is defined as that value of field which is necessary to drive a superconductor from its superconducting to its normal condition.)

In FIGURE 3, a plurality of vortices in a type II superconductor are illustrated schematically by the dots 22. (The area containing the plurality of vortices is sometimes known in this art as a "mixed state" area.) Each dot represents a normal area and there is associated with each dot a persistent circulating current. If an external current, indicated schematically by arrow 24, is applied to the superconductor strip of material 26, this current will pass right through the area containing the plurality of normal cores, since there are superconductive paths which pass between the cores. However, as in the case of the type I superconductors of FIGURE 1, the applied current 24 will cause the normal areas to move in a direction perpendicular to the applied current. If the persistent circulating current is clockwise, as shown, the applied current 24 will cause the cores to move to the left, as indicated by arrow 28, just as in the case of FIGURE 1.

When an applied current, such as 24, causes the cores 22 to move, a voltage appears across the ends of the superconductor strip, that is, across the dimension AB of the superconductor. This voltage is not due to ohmic losses (not due to an IR drop across the superconductor), since the path taken by the current is superconductive, that is, has zero resistance. The voltage is instead associated with the mechanical work necessary to move the normal areas across the strip of superconducting material.

The principles above are made use of in the present invention in a number of different ways. FIGURE 4 illustrates a simple motor which includes a strip 30 of superconductor material and a permanent magnet 32 rotatably mounted on an axle 34 and located above the superconductor strip 30. One pole of the magnet is located immediately adjacent to the surface of the strip 30 of superconductor material. The magnetic field produced by the magnet is of sufficient strength to penetrate through the superconductor strip 30, causing a small normal area 36 to appear in the superconductor. The return path for the flux lines extends from one pole, through the superconductor, to the space adjacent to the edges of the strip 30, to the opposite pole, as indicated by lines 38. A current source 40, which is coupled to edges 42 and 44 of the strip 30, applies a current to the strip 30.

The operation of the arrangement of FIGURE 4 is illustrated in FIGURES *5a–5c*. The normal area 36 is strongly coupled to the magnet 32. When a current is applied by the source 40, it tends to cause the normal area 36 to move in a direction perpendicular to the applied current, as indicated by arrows 46 in FIGURES *5b* and 4. This causes the lines 38 of magnetic flux to become extended. However, the minimum energy state of a magnetic system (any magnetic system always attempts to assume such a minimum energy state) implies the shortest possible magnetic lines of flux. To achieve this state, it is necessary for the magnet 32 to rotate clockwise, as shown in FIGURE *5c*, so that the pole 48 will continue to be as close as possible to the normal area 36.

The motor of FIGURE 4 is, of course, rather rudimentary. Unless there is sufficient flywheel effect, the magnet will come to rest when it is at a position such that one of its poles is no longer strongly coupled to a normal area in the superconductor strip 30. However, the motor may be modified, as shown in FIGURE *6a*, to improve its efficiency substantially. A plurality of permanent magnets 50 are employed rather than the single magnet 32 of FIGURE 4. The magnets are fixed to a nonmagnetic supporting element 52 and the supporting element is mounted on an axle 54. The same pole of each magnet, the south pole in this example, is secured to the support 52.

The operation of the motor of FIGURE *6a* is believed to be self-evident from the explanation which has already been given. The current source 40 causes a current to flow through the strip 30 in the direction of arrow 56. This current causes the normal area to move in the direction or arrow 58 (or if the trapped flux is of opposite sense, in the opposite direction). As the normal area moves, the magnets on support 52 rotate about axle 54. As one magnet moves away from the surface of the superconductor strip 30, the next adjacent magnet moves near to the surface, creating another normal area. This other normal area continues to be driven in the direction of arrow 58, and the magnet associated therewith therefore also moves. Thus, continuous motion of the magnetic rotor 50–52 is achieved.

As is well understood in this art, when a current is applied to a strip, such as 30 of FIGURE *6a*, it tends to distribute nonuniformly across the width of the strip. The current density is relatively high at the edges of the strip and relatively low at the center of the strip. In one sense, this enhances the operation of the invention, as it permits the normal area more readily to form in the edge portion of the strip when the pole of a magnet approaches this edge portion of the strip. Moreover, the effect of the drive current supplied by current source 40 is also relatively strong at the edge portion of the strip in view of the high drive current density present there. On the other hand, as the normal area approaches the center of the strip, the driving current density decreases and its effect on moving the normal area decreases correspondingly.

FIGURE *6b* shows a strip arrangement which provides relatively uniform current distribution across the width of the superconductor strip 30. The return path for the current of source 40 is via a second strip **30*a* which is of substantially the same dimensions as strip 30 and which is joined to strip 30 at the edge portion 31 of strip 30. Strip 30*a* may be formed of an ordinary metal, such as copper, rather than a superconductor, and, in this case, may be placed relatively close to, for example, several thousand angstroms from, the strip 30. The magnetic field created by the current returning in strip 30*a* causes the current passing through strip 30** to tend to spread uniformly across the width of the strip.

In an alternative form of the arrangement such as shown in FIGURE *6b*, strip **30*a* is formed of a superconductor which cannot be driven normal as easily as the superconductor 30. For example, if strip 30 is made of tin, strip 30*a* may be made of lead. In this embodiment of the invention, the strip 30 should be spaced a substantial distance from strip 30*a*. The distance will depend upon the width of the strips and may be, for example, one millimeter or so for a strip width of one centimeter. The effect of strip 30*a* on the drive current carried by strip 30 is similar to that already discussed for the embodiment in which strip 30*a*** is an ordinary metal.

While not illustrated in FIGURE *6b*, it is to be understood that a rotor similar to the one in FIGURE *6a* is positioned over the strip. Further, it is to be understood that the arrangement of FIGURE 6*b* is applicable to the other embodiments of the invention employing strips as, for example, the embodiment of FIGURE 9*a*.

Figures 6A, 6B:
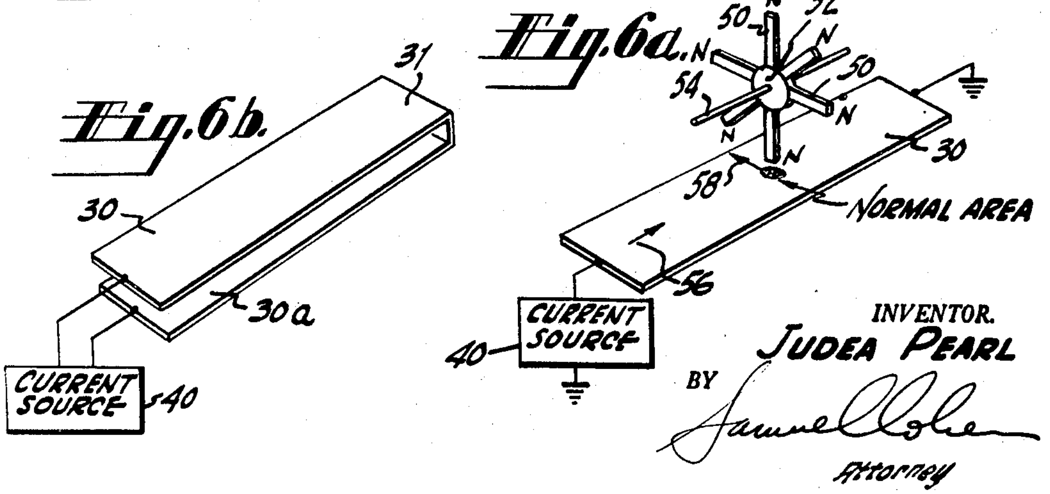

The superconductor employed for strip 30, both in FIGURE 4 and in FIGURES 6*a* and 6*b* may be type I superconductor or type II superconductor. The same holds for the embodiments of FIGURES 7*a*, 7*b* and 8. However, in the remaining embodiments, a type II superconductor should be employed for reasons which will become evident later.

Operation of the present invention as a motor has been described thus far. However, the embodiments of FIGURES 4 and 6, as well as others to be discussed, are also operative as generators. For operation in this manner, a drive means, such as a motor, is connected to the magnets for continuously rotating the magnets. This causes a current to be generated in the superconductor material 30 in the direction of arrow 56 of FIGURE 6*a* (or in the opposite direction). A load may be connected to receive this current at 40 in FIGURE 6, for example.

In the arrangement of FIGURE 7*a*, a hollow, cylindrically shaped, superconducting element 60 is substituted for the strip 30 of FIGURE 4. The magnetic rotor 62 is preferably positioned relatively close to one of the open ends of the cylinder to permit the magnetic flux lines of the magnet to return through air to the opposite pole of the magnet. One such flux line is shown at 64 in FIGURE 7*a*. The operation of this embodiment of the invention as a motor follows from the explanation already given of FIGURE 6. The arrangement of FIGURE 7*a* is substantially more efficient than the one of FIGURE 6, as the poles of the magnet are always equidistant from the superconducting cylinder 60 and are always tightly coupled to the normal areas of the cylinder.

FIGURE 7*b* shows the arrangement of FIGURE 7*a* operating as a generator, rather than as a motor. The magnetic rotor 62 is continuously driven by a motor 66. An electrical load 68 is connected to the ends of the cylinder and receives the current generated in the superconducting cylinder 60. The current direction is the one indicated by arrow 70. It is obvious that if the direction of motor rotation is reversed, the current direction also reverses.

The embodiments of FIGURES 7*a* and 7*b* include a plurality of permanent magnets located within a superconducting cylinder 60. The magnets may instead be located outside the cylinder, as shown in FIGURE 8. The magnets are mounted to a circumferential, nonmagnetic, supporting structure 72. As in the previous embodiments, the same pole of each magnet faces the superconducting cylinder 60, each pole being immediately adjacent to the surface and all poles being spaced the same amount from the surface. As in the embodiments of FIGURES 7*a* and 7*b*, it is preferable that the magnets be located close to the open end of the cylinder to permit the magnetic flux lines to close.

The structure 72 is rotatably mounted on a supporting means (not shown). An applied current from source 40 causes the normal areas to move around the circumference of the cylinder. This movement causes corresponding movement of the rotor 72. As in the case of the other embodiments, the one of FIGURE 8 is suitable for use as a generator if the rotor 72 is driven by some external means.

In the embodiments of FIGURES 7*a*, 7*b* and 8, it is desirable that the drive current (in the case of a motor) or the generated current (in the case of a generator) be uniformly distributed over the cylindrical surface. Such distribution is achieved by the use of multiple leads such as shown at 73 and 75 in FIGURE 7*a*, which are connected at one end to respective common points 77 and 79 and at the other end to circumferentially spaced points at the respective opposite open ends of the cylinder.

The arrangement of FIGURE 9*a* includes a length 80 of type II superconductor. The length is of arc-shaped cross-section and extends partially about a rotor 82. (As an alternative, a cylinder, as shown in FIGURE 7, may be employed instead of the strip 80.) The rotor consists of two nonmagnetic discs 84 which hold in place a permanent magnet 86 of zigzag cross-section. The outer edges of this magnet are all permanently magnetized in the same direction. These outer edges, when adjacent to the strip 80, induce a zigzag array of superconducting vortices (a zigzag-shaped mixed state area) which extends across the entire width dimension of the superconductor 80. This array is shown at 88 in FIGURE 9*b*.

As already mentioned, the superconductor of which the element 80 is made is a type II superconductor. Therefore, even though the vortices extend across the entire width of the strip, if a current I is applied to the strip, it will pass right through the superconducting areas which surround the vortices. However, this current will cause the zigzag-shaped area to move toward the edge of the strip, either in the direction of arrow 90 of FIGURE 9*b* or in the opposite direction. The movement of the zigzag area will cause corresponding movement of the rotor 82 for the reasons already given in connection with the previous embodiments. As there are many more interfaces between normal and superconducting regions "seen" by the driving current in the arrangement of FIGURE 9*a* than in the previous ones discussed, this motor is substantially more efficient than these previous motors. The same holds for the modified version of FIGURE 9*a*, that is, the version acting as a generator rather than as a motor.

Figures 10A, 10B, 10C, 11A, 11B:
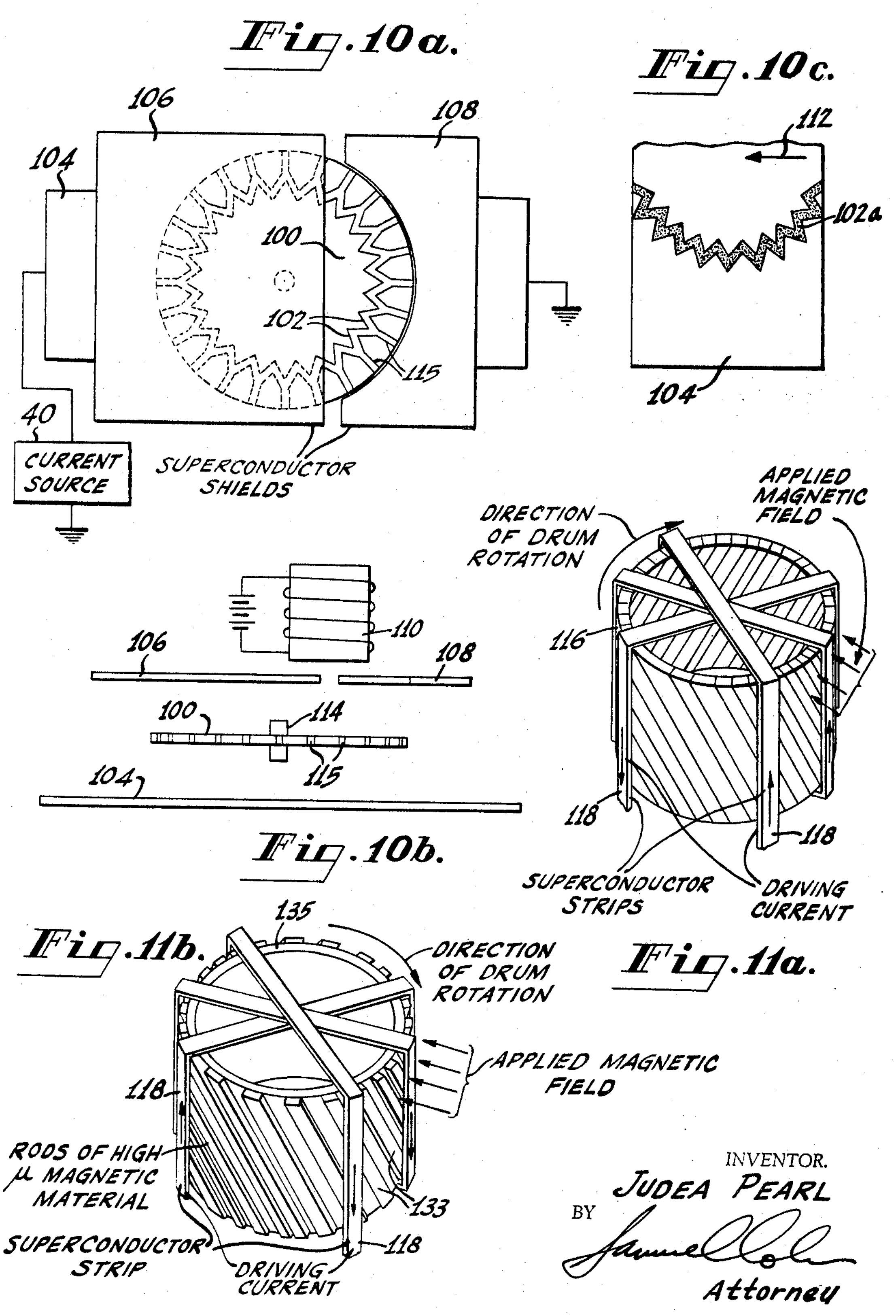

Another embodiment of the invention, this one with a rotor of extremely light weight, is illustrated in FIGURES 10*a*–10*c*. The rotor is shown at 100, and it consists of a superconductor disc formed with a zigzag-shaped magnetic field permeable region therethrough, such as slot 102, which extends around the circumferential edge portion of the rotor. For mechanical strength, the slot may be filled either with an insulator or with a metal which does not have magnetic field shielding properties. A strip 104 of type II superconductor is located immediately beneath the rotor. Elements 106 and 108 are superconductor magnetic field shielding elements. They and disc 100 are formed of a superconductor having a higher critical magnetic field than the superconductor of which strip 104 is formed. The entire arrangement is immersed in a magnetic field which may be produced, for example, by the electromagnet 110, shown in FIGURE 10*b*.

In the operation of the embodiment of FIGURE 10, the magnetic field produced by magnet 110 is shielded from the superconductor strip 104, except in the region of the zigzag slot 102. The magnetic field passes through this slot and causes a zig-zag-shaped area **102*a*, which extends across the entire width of the strip 104**, to enter the mixed state. This area is shown in FIGURE 10*c*. If now a direct current from source 40 is applied to the strip, it will cause the zigzag-shaped area to move across the width of the strip, either in the direction of arrow 112 of FIGURE 10*c* or in the opposite direction. As the magnetic field passing through the slot 102 is strongly coupled to the moving zigzag area **102*a*, the rotor 100 rotates on its axle 114 in order to maintain the zigzag-shaped slot 102 aligned with the moving zigzag-shaped mixed-state area 102*a*** (FIGURE 10*c*).

In a preferred form of the invention of FIGURE 10*a*, radial slots 115, which may be filled with a material which does not have magnetic field shielding properties, join the zigzag slot 102 with the circular edge of the disc. This permits the magnetic field more easily initially to enter the slot 102. If the radial slots 115 are not present, the magnetic field will concentrate at the edge of the superconductor disc and may only drive the edge portion of the disc into the mixed state. It is therefore desirable, in the absence of the radial slots, initially to increase the magnetic field strength to a value such that the magnetic lines of flux pass a sufficient area at the edge portion of the disc to reach the slot 102. Then, the field may be reduced to a value somewhat lower than the critical value for the superconductor material employed.

As already mentioned, an important feature of the motor of FIGURES 10–10*b* is that the rotor 100 need not have any permanent magnets associated therewith and therefore can be made of relatively light-weight material. The rotor has very little inertia and there is very little friction created between the axle 114 (FIGURE 10*b*) and its bearings (not shown).

As in the previous embodiments, the motor of FIGURES 10*a*–10*c*, with suitable modification, is operative as a generator. The modification is the connection of a driving means to the rotor 100 for mechanically rotating the rotor. The power output is available at the connections now shown connected to the current source 40.

Another type of motor and generator according to the present invention is shown in FIGURE 11*a*. It includes a cylindrically shaped drum 116 formed of a superconductor and having slot-shaped magnetic field permeable regions therein, all arranged at the same angle to the cylinder axis. These regions extend from one edge to the other of the cylinder and are filled with a material which does not have magnetic field shielding properties such as an insulator or an ordinary metal such as copper. A strip 118 formed of a type II superconductor is wound over the slotted cylinder in the manner shown. A magnetic field is applied to the cylinder in a direction perpendicular to the cylinder axis. The cylinder is mounted on an axle (not shown) which is aligned with the axis of the cylinder and is rotatable on this axle.

The operation of the arrangement of FIGURE 11*a* may be better understood by referring to FIGURES 12, 13*a* and 13*b*. FIGURE 12 shows a slot-shaped region 120 on one side of the cylinder and a slot-shaped region 122 on the opposite side of the cylinder. (Regions 120 and 122 are shown to be transparent in the drawing, but need not be transparent.) It also shows a strip portion **118*a* next to slot 120 and a strip portion 118*b* near slot 122. The portion 116*a* of the drum, which is formed of a material having a higher critical magnetic field than that of the strip, acts as a shield to the applied magnetic field H, except in the area formed with the slot 120. The magnetic field passes through this slot and passes also through the region 124, shown cross-hatched, of the strip portion 118*a*, driving this region into the mixed state. (This strip, it will be recalled, is formed of a type II superconductor.) In a similar manner, the region 116*b* of the cylinder acts like a shield to the magnetic field, except where it is formed as a slot 122. The magnetic field passing through this slot causes the region 126 of strip 118*b*** to be driven into the mixed state.

An enlarged view of the mixed state area 124 is shown schematically in FIGURE 13*a*. It consists of a very large number of very small normal "cores" shown as dots 128, and each such core has a current circulating about it in the same direction, shown as clockwise in FIGURE 13*a*. If now a current is applied to the strip **118*a*, it passes through the region (the mixed state area) which includes the normal cores and tends to cause these cores to move to the left for the reasons given previously. As in the previous embodiments of the invention, the magnetic field passing through the slot 120 of FIGURE 12 is strongly coupled to the cores 128**. When these cores attempt to move to the left, the slot attempts to move with them to maintain the slot in perfect alignment with the mixed state region. The result is shown in FIGURE 13*b*. The cores 128, shown together as a cross-hatched mixed state area 124 in FIGURE 13*b*, move to the left; however, a component of this motion is in the downward direction as indicated by arrow 129. The slot 120 is tightly coupled to the mixed state area and, by moving to the left, is able to follow this downward component of movement. The movement of the slot to the left corresponds to clockwise movement of the cylinder and causes the mixed state area to move as shown by dashed cross-hatching **124*a*** in FIGURE 13*b*. Thus, the current I applied to strip portion **118*a*** causes the cylinder to rotate clockwise.

An analysis similar to that given above applies to the portion **116*b* of the cylinder opposite portion 116*a*. The current passing through strip 118*b* passes its slot in a direction opposite to that of current in strip portion 118*a*. However, the slot 122 is at a complementary angle to the slot 120 (as "seen" by the current flowing through the strip). Accordingly, the current I which flows causes the drum portion 116*b* to rotate to the right (arrow 131**), and this also corresponds to clockwise rotation of the drum. The overall result of the action above is to produce a net torque which rotates the drum in a single direction, clockwise in the example given. This embodiment of the invention, like the one of FIGURE 10, has the important advantage that permanent magnets need not be fixed to the rotating element of the motor.

In the embodiment of the invention shown in FIGURE 11*a*, there are slots which extend from one edge to the other of a cylinder formed of a superconductor material. The slots may be filled with a material which does not exhibit magnetic field shielding properties. An alternative construction which operates in the same way as the embodiment of FIGURE 11 includes a cylinder formed of an insulating material with superconducting rods or strips fixed to the cylinder and which are all at the same acute angle to the length dimension of the cylinder.

A third form of the invention of FIGURE 11*a* is shown in FIGURE 11*b*. It does not require any superconducting material in the rotor. Instead, rods 133 are secured to an insulating cylinder 135, as in the second embodiment described above. However, these rods 133 are formed of a magnetic material which exhibits high permeability but which has no remanence. One such material which exhibits the desired properties at the low temperatures at which superconductivity is possible is Supermalloy, a commercially available alloy consisting of 15.7% iron, 79% nickel, 5% molybdenum and 0.3% manganese.

The operation of the embodiment of the invention of FIGURE 11*b* is analogous to that of the embodiments of FIGURE 11*a* in that the high permeability rods concentrate the magnetic field. The concentrated field causes the mixed state areas (FIGURE 12) in the strips 118, and these mixed state area are caused to move by the driving current applied to the strips.

The operation of the three different embodiments of FIGURE 11 described above, as a generator, is straightforward from what has previously been said.

The embodiment of the invention shown in FIGURE 14 includes a rotatably mounted rotor 130. The rotor includes a plurality of permanent magnets 132, each at the same acute angle to the axis of rotation (illustrated by dashed line 134) of the rotor. A solenoid 136, shown as a strip-shaped length of super-conductor material having a single turn, surrounds the rotor and is equidistant from the south poles of the magnets 132. The solenoid 136 is formed of a type II superconductor.

In the operation of the apparatus of FIGURE 14 as a motor, the magnets 132 each cause a region of the solenoid 136 to be driven into the mixed state. The region is shown cross-hatched at 138 in FIGURE 15. This region is at an angle to the axis of the cylinder formed by the solenoid 136. When a current I is applied by the source 40, the current causes the mixed state area to move across the short dimension of the strip. A component of this movement is in the circumferential direction of the strip, just as in the embodiment of FIGURE 11. This circumferential component of the movement causes the rotor 130 to move along with the normal areas 138 in order to maintain the magnets in alignment with the mixed state areas.

A schematic representation of the embodiment of the invention shown in FIGURE 14 appears in FIGURE 16. However, in the schematic showing, multiple turns of strip-shaped super-conductor are employed for the solenoid 136. The use of multiple turns rather than a single one permits a current from source 40 of a given value to have a greater effect on the rotation of the rotor 130. The use of multiple turns is somewhat analogous to the use of multiple turns in a transformer winding.

If the rotor 130 is mechanically driven, the embodiment of the invention shown in FIGURES 14 and 16 operates as a generator rather than as a motor.

An improved form of the invention of FIGURES 14–16 is shown in FIGURE 17. In this embodiment, there are a plurality of concentric solenoids 140, 142, 144, each shown as having a single turn but which can have multiple turns instead. There are also a plurality of circumferentially arranged rotors, each shown as having four permanent magnets. The outer rotor has magnets **146*a*–146*d*. The next rotor has four magnets 148*a*–148*d*, and so on. The three rotors 146, 148 and 150 are mechanically coupled to one another and rotate in unison. Similarly, the three solenoids 140, 142 and 144** are electrically coupled in such manner that current flows in the same direction in all solenoids.

While shown schematically, the solenoids of FIGURE 17 are strip-shaped, just as the solenoids of FIGURE 14. The permanent magnets are all arranged at the same acute angle to the axis of the three solenoids, just as in the embodiment of FIGURE 14. Also, the solenoids are all formed of a type II superconductor, just as in the embodiment of FIGURE 14.

The operation of the embodiment of the invention shown in FIGURE 17 is analogous to that shown in the arrangement of FIGURE 14. When circuit 160 is acting as a current source, the arrangement of FIGURE 17 is a motor and the rotor 146, 148, 150 drives the mechanical load 162. When the rotor is driven by mechanical drive means 162, element 116 is an electrical load which receives the current produced in the solenoid windings 140, 142 and 144.

An important feature of the arrangement of FIGURE 17 is the close coupling between the magnets of the successive rotors. For example, the return path for the south pole of magnet **146*a* is to the north pole of magnet 148*a*, the close spacing between these magnets providing an intense magnetic field which passes through the superconductor strip 142**.

The motor shown in FIGURE 18 includes a plurality of permanent magnets 170 secured to a disc 172 which may be formed of insulating material. The permanent magnets are all poled in the same direction and arranged in zigzag configuration, as shown. The disc 172 and magnets 170 comprise a rotor, and this rotor is fixed to an axle 174.

A disc 176 formed of a type II superconductor is spaced from the permanent magnets 170 and is parallel to the poles of the magnets. A current source 178 is connected at one terminal to the center 180 of the superconductor disc and at its other terminal to a plurality of points 182 spaced around the circumference of the disc.

In the operation of the motor of FIGURE 18, the current supplied by source 178 flows in radial paths in the superconductor disc 176. This current is the driving current for the zigzag-shaped mixed-state area 184 and causes this mixed-state area to rotate circumferentially of the disc, as, for example, in the direction of arrow 186. The movement of this mixed state area causes the rotor 170, 172 to move in a manner similar to that already described.

As in the other embodiments of the invention, the one of FIGURE 18 is operative as a generator, rather than as a motor. For such operation, the rotor is mechanically driven and the current which is generated is supplied to a load located at 178.

The embodiment of the invention shown in FIGURE 19 is similar in structure to the one in FIGURE 18 with the exception that the zigzag-shaped element 190 is formed of a magnetic material having high permeability which may have high remanence or low remanence, rather rather than being formed of permanent magnets. An example of such material having low remanence has already been given. High in high remanence materials are well known. And, a uniform magnetic field, indicated by arrows 192, is applied to element 190 in the direction of axle 174. The high permeability material concentrates the uniform magnetic field, causing a mixed state area 184 to occur in the disc 176.

FIGURE 19 illustrates the operation of the invention as a generator. Motor 194 is coupled to the axle 174 and the load 196 receives the current which is generated. The operation of this embodiment of the invention as a generator is, of course, also possible and follows from FIGURE 18.

What is claimed is:

1. In combination:

a length of superconducting material;

means including a rotatable element for applying a magnetic field to said material for establishing and always maintaining a normal area therein which is magnetically coupled to said rotatable element; and means for continuously applying a steady, direct current to a region of said superconducting material in which said normal area is located for causing said normal area continuously to move and the rotatable element continuously to move with it.

2. In combination:

a length of superconducting material;

means including an element which is rotatable about an axis parallel to the length dimension of said length of superconducting material for applying a magnetic field to said material for establishing a normal area therein which is magnetically coupled to said rotatable element; and means tending to produce relative movement between said rotatable element and normal area, in a direction perpendicular to the length dimension of said length of superconducting material, for causing the rotor to rotate in a plane perpendicular to the length dimension of said length of superconducting material.

3. In combination:

a length of superconducting material;

a rotatable element formed of superconducting material which requires a substantially larger magnitude magnetic field to drive it normal than required to drive the length of superconducting material normal and having magnetic field permeable regions therethrough, said element being located adjacent to the length of superconducting material;

means for applying a magnetic field to said length of superconducing material through the magnetic field permeable regions of said rotatable element for establishing mixed state areas in said length of superconducting material which are magnetically coupled to said magnetic field permeable regions of said rotatable element; and means tending to produce relative movement between said rotatable element and mixed state areas for causing the rotatable element and normal areas to move, in synchronism.

4. In combination:

a length of superconducting material;

means including an element which is rotatable about an axis substantially parallel to the length dimension of the length of superconducting material, for applying a magnetic field to said material for establishing at least one normal area therein which is magnetically coupled to said rotatable element; and means for applying a current to the length of superconducing material in the direction of the length dimension thereof, for causing the rotatable element to rotate.

5. In combination:

a length of superconducting material;

means including a plurality of permanent magnet elements which extend radially from and are rotatable about a common axis substantially parallel to the length dimension of the length of superconducting material, each element being poled in the same direction relative to said axis, and each element applying a magnetic field to said material for establishing a normal area therein which is magnetically coupled to said element; and means for applying a current to the length of superconducting material in the direction of the length dimention thereof, for causing the plurality of permanent magnet elements to rotate about said axis.

6. In combination:

a cylinder of superconducting material;

means including a plurality of permanent magnet elements which extend radially from and are rotatable about the axis of said cylinder, each element being poled in the same direction relative to said axis, a pole of each element being adjacent to a surface of the cylinder, and each element applying a magnetic field to said cylinder for establishing a normal area therein which is magnetically coupled to said element; and means tending to produce relative movement between said rotatable element and normal areas for causing the normal areas and magnet elements to rotate together about said axis.

7. The combination set forth in claim 6 wherein said magnet elements are located within said cylinder.

8. The combination set forth in claim 6 wherein said magnet elements are located outside of said cylinder.

9. The combination set forth in claim 6 wherein the means tending to produce relative movement comprises means for applying a current to said cylinder which flows in the direction of said axis of said cylinder.

10. The combination set forth in claim 6 wherein the means tending to produce relative movement comprises mechanical means coupled to said permanent magnet elements for rotating them about said axis.

11. In combination:

a length of type II superconductor material in the superconducting state;

a rotatable element positioned next to said length of type II superconductor material, formed of superconducting material which requires a substantially larger magnitude magnetic field to penetrate therethrough then required to drive the length of superconductor material into the mixed state and having slot-shaped magnetic field permeable regions therethrough;

means for applying a magnetic field to said length of superconducting material through the slot-shaped regions of said rotatable element for establishing at least one mixed state area in said length of superconductor material which is magnetically coupled to said slot-shaped regions of said rotatable element; and means tending to produce relative movement between said rotatable element and mixed state areas for causing the rotatable element and mixed state areas to move, in synchronism.

12. In combination:

a hollow cylinder, open at at least one end, formed of a superconducting material;

a rotor which is rotatable in a plane perpendicular to the cylinder axis, and which is magnetically coupled to at least one normal region in the cylinder; and means for causing the normal region and rotor to move in synchronism circumferentially of the cylinder.

13. In combination:

a hollow, rotatable cylinder formed of a superconductor material in the superconducting state and formed with a plurality of slot-shaped magnetic field permeable regions therethrough, all at the same acute angle to the axis of the cylinder;

a strip of type II superconductor material, in the superconducting state, one portion of which is parallel to said axis and lies adjacent to one portion of the surface of the cylinder, and another portion of which is parallel to said axis and lies adjacent to an opposite portion of the surface of said cylinder, said strip being formed of a material which can be placed in the mixed state at a lower magnitude of magnetic field than required to switch the material of which the cylinder is made out of the superconducting state; and means for applying a magnetic field to the cylinder of a magnitude sufficient to pass through said slot-shaped regions therethrough and to place portions of said strip adjacent to said slot-shaped regions in the mixed state, but insufficient to drive said cylinder out of the superconducting state.

14. In combination:

a hollow, rotatable cylinder formed of a superconductor material in the superconducting state and formed with a plurality of slot-shaped magnetic field permeable regions therethrough, all at the same acute angle to the axis of the cylinder;

a strip of type II superconductor material, in the superconducting state, one portion of which is parallel to said axis and lies adjacent to one portion of the surface of the cylinder, and another portion of which is parallel to said axis and lies adjacent to an opposite portion of the surface of said cylinder, said strip being formed of a material which can be placed in the mixed state at a lower magnitude of magnetic field than required to switch the material of which the cylinder is made out of the superconducting state;

means for applying a magnetic field to the cylinder of a magnetic sufficient to pass through said slot-shaped regions and to place portions of said strip adjacent to said slot-shaped regions in the mixed state, but insufficient to drive said cylinder out of the superconducting state; and means for applying a current to the strip of superconductor material for causing said cylinder to rotate.

15. In combination:

a hollow, rotatable cylinder formed of a superconductor material in the superconducting state and formed with a plurality of slot-shaped magnetic field permeable regions therein, all at the same acute angle to the axis of the cylinder;

a strip of type II superconductor material, in the superconducting state, one portion of which is parallel to said axis and lies adjacent to one portion of the surface of the cylinder, and another portion of which is parallel to said axis and lies adjacent to an opposite portion of the surface of said cylinder, said strip being formed of a material which can be placed in the mixed state at a lower magnitude of magnetic field than required to switch the material of which the cylinder is made out of the superconducting state;

means for applying a magnetic field to the cylinder of a magnitude sufficient to pass through said slot-shaped regions therein and to place portions of said strip adjacent to said slot-shaped regions in the mixed state, but insufficient to drive said cylinder out of the superconducting state; and means coupled to said cylinder for rotating the same, whereby current is caused to flow in said strip.

16. In combination:

a hollow, rotatable cylinder formed of a superconductor material in the superconducting state and formed with a plurality of slot-shaped magnetic field permeable regions therein, all at the same acute angle to the axis of the cylinder;

a strip of type II superconductor material, in the superconducting state, a first portion of which is parallel to said axis and lies adjacent to one portion of the surface of the cylinder, and a second portion of which is parallel to said axis and lies adjacent to an opposite portion of the surface of said cylinder, said strip being formed of a material which can be placed in the mixed state at a lower magnitude of magnetic field than required to switch the material of which the cylinder is made out of the superconducting state; and means for applying a magnetic field to the cylinder having a substantial component normal to said axis and to the surfaces of said first and second portions of said strip, and having a magnitude sufficient to pass through said slot-shaped regions and to place portions of said strip adjacent to said slot-shaped regions in the mixed state, but insufficient to drive said cylinder out of the superconducting state.

17. In combination:

a strip of type II superconductor material in the superconducting state;

magnetic means, including a rotatable element, for establishing a mixed state area which extends across the entire width of said strip and is magnetically coupled to said rotatable element; and means tending to produce relative movement between said mixed state area and rotatable element for causing said mixed state area and rotatable element both to move, in synchronism.

18. In combination:

a strip of type II superconductor material in the superconducting state;

magnetic means, including a rotatable element formed of a magnetic field shielding material and having a magnetic field permeable region therethrough, and means for directing a magnetic field through the magnetic field permeable region thereof for establishing a mixed state area which extends across the entire width of said strip and which is magnetically coupled to said magnetic field permeable region of said rotatable element; and means tending to produce relative movement between said mixed state area and rotatable element for causing said mixed state area and rotatable element both to move, in synchronism.

19. In the combination set forth in claim 18, the magnetic field permeable region of the rotatable element having a zigzag shape.

20. In combination:

a strip of type II superconductor material in the superconducting state;

magnetic means, including a cylindrically shaped, hollow, rotatable element formed of a magnetic field shielding material and having slot-shaped magnetic field permeable regions therein, all at the same acute angle to the cylinder axis, and means for directing a magnetic field through said slot-shaped regions for establishing a mixed state area which extends across the entire width of said strip and which is magnetically coupled to the slot-shaped regions in said rotatable element; and means tending to produce relative movement between said mixed state area and rotatable element for causing said mixed state area and rotatable element both to move, in synchronism.

21. In combination:

a strip of type II superconductor material in the superconducting state;

magnetic means, including a slotted, disc-shaped, rotatable element formed of a magnetic field shielding material and means for directing a magnetic field through the slotted portion thereof, for establishing a mixed state area which extends across the entire width of said strip and which is magnetically coupled to the slotted regions of said rotatable element; and means tending to produce relative movement between said mixed state area and rotatable element for causing said mixed state area and rotatable element both to move, in synchronism.

22. In combination:

a substantially cylindrically shaped strip of type II superconductor material in the superconducting state;

a rotor which is rotatable about the cylinder axis comprising a plurality of permanent magnets which extend radially from said axis, each magnet being poled in the same direction relative to said axis, and a pole of each magnet being located adjacent to the cylinder surface, being inclined at an acute angle to said axis and having a length sufficient to create a mixed state area in the cylinder which extends across the entire width of the strip; and means for causing the mixed state areas to move around the cylinder circumference and the rotor to rotate, in unison.

23. In combination:

a substantially cylindrically shaped strip of type II superconductor material in the superconducting state;

a rotor which is rotatable about the cylinder axis comprising permanent magnet means which extend radially from said axis, a given pole of said magnet means being circumferentially arranged adjacent to the cylinder surface for creating at least one mixed state area in the cylinder; and means for causing the mixed state areas to move around the cylinder circumference and the rotor to rotate, in unison.

24. In combination:

a plurality of substantially cylindrically shaped, spaced, coaxially arranged strips of type II superconductor material in the superconducting state;

a like plurality of mechanically coupled rotors which are rotatable together about the cylinder axis, each rotor comprising permanent magnet means which extend radially from said axis, and a given pole of each magnet means being circumferentially arranged adjacent to the surface of the cylinder associated with that magnet means for creating at least one mixed state area in its cylinder; and means for causing the mixed state areas in all cylinders to move around the circumferences of said cylinders and the mechanically coupled rotors to rotate in synchronism with the movement of the mixed state areas.

25. In combination:

a strip of type II superconductor material in the superconducting state;

a rotor which is rotatable about an axis parallel to the strip comprising permanent magnet means which extend radially from said axis, a given pole of said magnet means being located adjacent to the surface of said strip and being of zigzag cross-section for creating a zigzag-shaped mixed state area in the strip which extends across the width of the strip; and means for causing the concurrent movement of the mixed state area across the width of the strip and rotation of the rotor.

26. In the combination set forth in claim 25, said last-named means comprising means coupled to said strip for applying a current thereto.

27. In the combination set forth in claim 25, said last-named means comprising means coupled to said rotor for mechanically driving the rotor.

28. In combination:
a type II superconducting element;
a rotatable element formed of a magnetic field shielding material which includes magnetic flux concentrating means comprising magnetic field permeable regions in said rotatable element located adjacent to said superconducting element;
means for applying a magnetic field to said superconducting element via said magnetic flux concentrating means of said rotatable element for establishing at least one mixed state area therein; and
means tending to produce relative movement between said rotatable element and mixed state area for causing the rotatable element and mixed state area to move in synchronism.

29. In combination:
a hollow, rotatable cylinder comprising spaced magnetic flux concentrating regions, all at the same acute angle to the axis of the cylinder;
a strip of type II superconductor material in the superconducting state, one portion of which is parallel to said axis and lies adjacent to one portion of the surface of the cylinder, and another portion of which is parallel to said axis and lies adjacent to an opposite portion of the surface of said cylinder;
means for applying a magnetic field to the cylinder via said magnetic flux concentrating regions of said cylinder of a magnitude sufficient to place the regions of the strip adjacent to the magnetic flux concentrating regions of the cylinder in the mixed state; and
means for causing synchronous movement of the mixed state areas and the rotor.

30. In combination:
a hollow, rotatable cylinder comprising spaced magnetic flux concentrating regions formed of a magnetic material of relatively high permeability and relatively low remanence ,all at the same acute angle to the axis of the cylinder;
a strip of type II superconductor material in the superconducting state, one portion of which is parallel to said axis and lies adjacent to one portion of the surface of the cylinder, and another portion of which is parallel to said axis and lies adjacent to an opposite portion of the surface of said cylinder;
means for applying a magnetic field to the cylinder via said magnetic flux concentrating regions of said cylinder of a magnitude sufficient to place the regions of the strip adjacent to the magnetic flux concentrating regions of the cylinder in the mixed state; and
means for causing synchronous movement of the mixed state area and the rotor.

31. In combination:
a hollow, rotatable cylinder comprising spaced magnetic flux concentrating regions comprising magnetic field permeable regions spaced from each other by magnetic field shielding regions, all said flux concentrating regions being at the same acute angle to the axis of the cylinder;
a strip of type II superconductor material in the superconducting state, one portion of which is parallel to said axis and lies adjacent to one portion of the surface of the cylinder, and another portion of which is parallel to said axis and lies adjacent to an opposite portion of the surface of said cylinder;
means for applying a magnetic field to the cylinder via said magnetic flux concentrating regions of said cylinder of a magnitude sufficient to place the regions of the strip adjacent to the magnetic flux concentrating regions of the cylinder in the mixed state; and
means for causing synchronous movement of the mixed state area and the rotor.

References Cited

UNITED STATES PATENTS

| | | | |
|---|---|---|---|
| 3,277,322 | 10/1966 | Berlincourt | 310—40 |
| 3,336,489 | 8/1967 | Volger | 310—40 |

OTHER REFERENCES

Electrical Review, 3, January 1964, page 22, "Superconducting D.C. Generator."

Physics Letters, vol. II, No. 2, October 1962, pages 257, 258 and 259, "A Dynamo for Generating a Current in a Superconducting Circuit," by Volger, et al.

MILTON O. HIRSHFIELD, *Primary Examiner.*

D. X. SLINEY, *Assistant Examiner.*